United States Patent

Harris et al.

[11] Patent Number: 5,878,416
[45] Date of Patent: Mar. 2, 1999

[54] AUTOMATED SYSTEM AND METHOD FOR MATCHING AN ITEM OF BUSINESS PROPERTY TO A RECIPIENT

[75] Inventors: Bradly R. Harris, Princeton; James B. Cue, II, Flower Mound, both of Tex.

[73] Assignee: Electronic Data Systems Corporation, Plano, Tex.

[21] Appl. No.: 664,332

[22] Filed: Jun. 14, 1996

[51] Int. Cl.⁶ .................................................. G06F 17/30
[52] U.S. Cl. ............................. 707/10; 705/28; 705/8; 705/26; 705/29
[58] Field of Search .................. 705/28, 29, 26, 705/8; 707/10

[56] References Cited

U.S. PATENT DOCUMENTS

| | | | |
|---|---|---|---|
| 4,310,883 | 1/1982 | Clifton et al. | 364/200 |
| 4,797,818 | 1/1989 | Cotter | 705/26 |
| 4,799,156 | 1/1989 | Shavit et al. | 705/26 |
| 5,216,593 | 6/1993 | Dietrich et al. | 705/8 |
| 5,233,533 | 8/1993 | Edstrom et al. | 705/8 |
| 5,237,497 | 8/1993 | Sitarski | 705/8 |
| 5,315,509 | 5/1994 | Natarajan | 705/28 |
| 5,361,199 | 11/1994 | Shoquist et al. | 705/26 |
| 5,432,931 | 7/1995 | Woess et al. | 707/1 |
| 5,434,775 | 7/1995 | Sims et al. | 705/8 |
| 5,627,533 | 5/1997 | Clark | 341/51 |
| 5,636,310 | 6/1997 | Walles | 705/28 |
| 5,638,519 | 6/1997 | Haluska | 705/28 |
| 5,664,109 | 9/1997 | Johnson et al. | 705/2 |
| 5,712,989 | 1/1998 | Johnson et al. | 705/28 |

OTHER PUBLICATIONS

On Estimating Access Costs in Relational Databases, by Maio, Scalas and Tiberio, Information Processing Letters 19, pp. 157–161, Mar. 22, 1984.

*Primary Examiner*—Wayne Amsbury
*Assistant Examiner*—Shahid Alam
*Attorney, Agent, or Firm*—Christopher W. Kennerly; L. Joy Griebenow

[57] ABSTRACT

An automated system (10) for matching an item of business property to a recipient includes an inventory database (32) containing inventory data (34) concerning the item. A match module (30) is coupled to the inventory database (32) and receives allocation data (14) for the item. The match module (30) generates match data (180) for the item and associates the match data (180) with the inventory data (34). The match module (30) receives an item request (33) containing request data (152) and matches the item to the recipient associated with the item request (33) using the match data.

22 Claims, 7 Drawing Sheets

| | | |
|---|---|---|
| 104 | RECIPIENT | ---- |
| 106 | ITEM NUMBER | T00000311 |
| 108 | LOCATION | NW-35 |
| 109 | ITEM TYPE | COMPUTER |
| 110 | MANUFACTURER | HEWL/PACK |
| 112 | PART NUMBER | 33440A |
| 114 | SERIAL NUMBER | 2743J85944 |
| 116 | ITEM VALUE | ---- |
| 118 | CONTACT | CLYDE |
| 120 | CONTACT TELEPHONE | 9-2379 |
| 122 | AVAILABILITY DATE | 06/01/96 |
| 124 | AUTHORIZER | ---- |
| | . . . | |
| 128 | SUBMITTER | WALTER |
| 130 | COORDINATOR | JOE |
| 132 | AUTHORIZER | BARB |
| 134 | SUBMITTER FACSIMILE | 8-6942 |
| 134 | AUTHORIZER ADDRESS | BARB@AUTHORIZER.COM |
| 136 | AUTHORIZATION DATE | 06/01/96 |
| 138 | AUTHORIZATION TIME | 10:16 |
| 140 | PROVISION DATE | 06/01/96 |
| 140 | PROVISION TIME | 10:27 |
| 142 | ROUTING HISTORY | BARB; JOE; WALTER |
| 144 | TRANSACTION | B00081 |
| | . . . | |

| 154 | ITEM IDENTIFIER | ---- |
|---|---|---|
| 156 | ITEM TYPE | COMPUTER |
| 158 | MANUFACTURER | HEWL/PACK |
| 160 | SPECIFICATION | 486 |
| 162 | VALUE | ---- |
| 164 | ALLOCATE DATE | 06/15/96 |
| 166 | URGENCY | 7 |
| | . . . | |
| 170 | REQUESTOR | KEN |
| 172 | RECIPIENT 1 | ART |
| | RECIPIENT 2 | LEE |
| 174 | RECIPIENT 1 FACSIMILE | 8-8675 |
| | RECIPIENT 2 ADDRESS | LEE@RECIPIENT.COM |
| 176 | PROVISION DATE | 05/30/96 |
| | PROVISION TIME | 8:52 |
| 178 | REQUEST NUMBER | R00000264 |
| | . . . | |

Rows 154–166 are bracketed as 152; rows 170–178 are bracketed as 168.

*FIG. 3A*

| | | |
|---|---|---|
| 109 | ITEM TYPE | COMPUTER |
| 110 | MANUFACTURER | HEWL/PACK |
| 112 | PART NUMBER | 33440A |
| 118 | CONTACT | CLYDE |
| 120 | CONTACT TELEPHONE | 9-2379 |
| 122 | AVAILABILITY DATE | 06/01/96 |
| | . . . | |
| 182 | VALUE | $295.00 |
| 184 | FIXED ASSET | YES |
| 186 | LOCATION | NW-35 |
| 188 | PREVIOUS LOCATION | SE-12 |
| 190 | PURCHASE DATE | 02/17/92 |
| 192 | PURCHASE COST | $1475.00 |
| | . . . | |
| 37 | AVAILABILITY | ✓ |

AUTOMATED SYSTEM AND METHOD FOR MATCHING AN ITEM OF BUSINESS PROPERTY TO A RECIPIENT

TECHNICAL FIELD OF THE INVENTION

This invention relates in general to the field of data communications, and more particularly to an automated system and method for matching an item of business property to a recipient.

BACKGROUND OF THE INVENTION

Many organizations allocate selected items of business property according to the needs of the organization and the characteristics of the item and recipient. It is often desirable to allocate these items in response to information provided by a submitter. For example, a submitter might provide information concerning an excess item to match the item to another individual, group, department, site, or other recipient within or outside the organization.

As organizations become larger and more complex to serve a variety of customer and internal requirements, organizations may match items of business property to recipients using various techniques. A known technique for matching an excess item of business property to a recipient uses manual submission, authorization, and request matching processes that are often relatively slow and laborintensive. Information communicated by hard copy, facsimile, or telephone in connection with such techniques may be illegible, inaccurate, misdirected, delayed, or even lost. In addition, authorization for the matching may be obtained and request matching performed inadequately, improperly, or not at all. Furthermore, information concerning excess items may not be maintained in a location that allows access by potential recipients. As a result, matching an item to a recipient may require several days, causing consequent backlogs and undesirable delays. Moreover, organizations using such techniques may have little flexibility to support customer or internal time and space constraints.

SUMMARY OF THE INVENTION

In accordance with the present invention, the disadvantages and problems associated with systems and methods for matching an item of business property to a recipient have been substantially reduced or eliminated.

In accordance with one embodiment of the present invention, an automated system for matching an item of business property to a recipient includes an inventory database containing inventory data concerning the item. A match module is coupled to the inventory database and receives allocation data for the item. The match module generates match data for the item and associates the match data with the inventory data. The match module receives an item request containing request data and matches the item to the recipient associated with the item request using the match data.

Important technical advantages of the present invention include providing an automated system and method for matching an item of business property to a recipient that incorporates automatic submission, authorization, and request matching processes to give organizations the ability to match items in an efficient, timely, and accurate manner. The present invention decreases the transaction time for matching each item and may further decrease manpower requirements associated with the matching process. The present invention also enhances the ability of the organization to respond to customer requirements and external or internal equipment needs and storage constraints. Other technical advantages are readily apparent to one skilled in the art from the following figures, descriptions, and claims.

BRIEF DESCRIPTION OF THE DRAWINGS

For a more complete understanding of the present invention and for further features and advantages thereof, reference is now made to the following description taken in conjunction with the accompanying drawings, in which:

FIG. 2 illustrates an exemplary input form containing allocation data;

FIGS. 3a and 3b illustrate an exemplary relationship between an item request and availability data for an item.

DETAILED DESCRIPTION OF THE INVENTION

Figure 1:
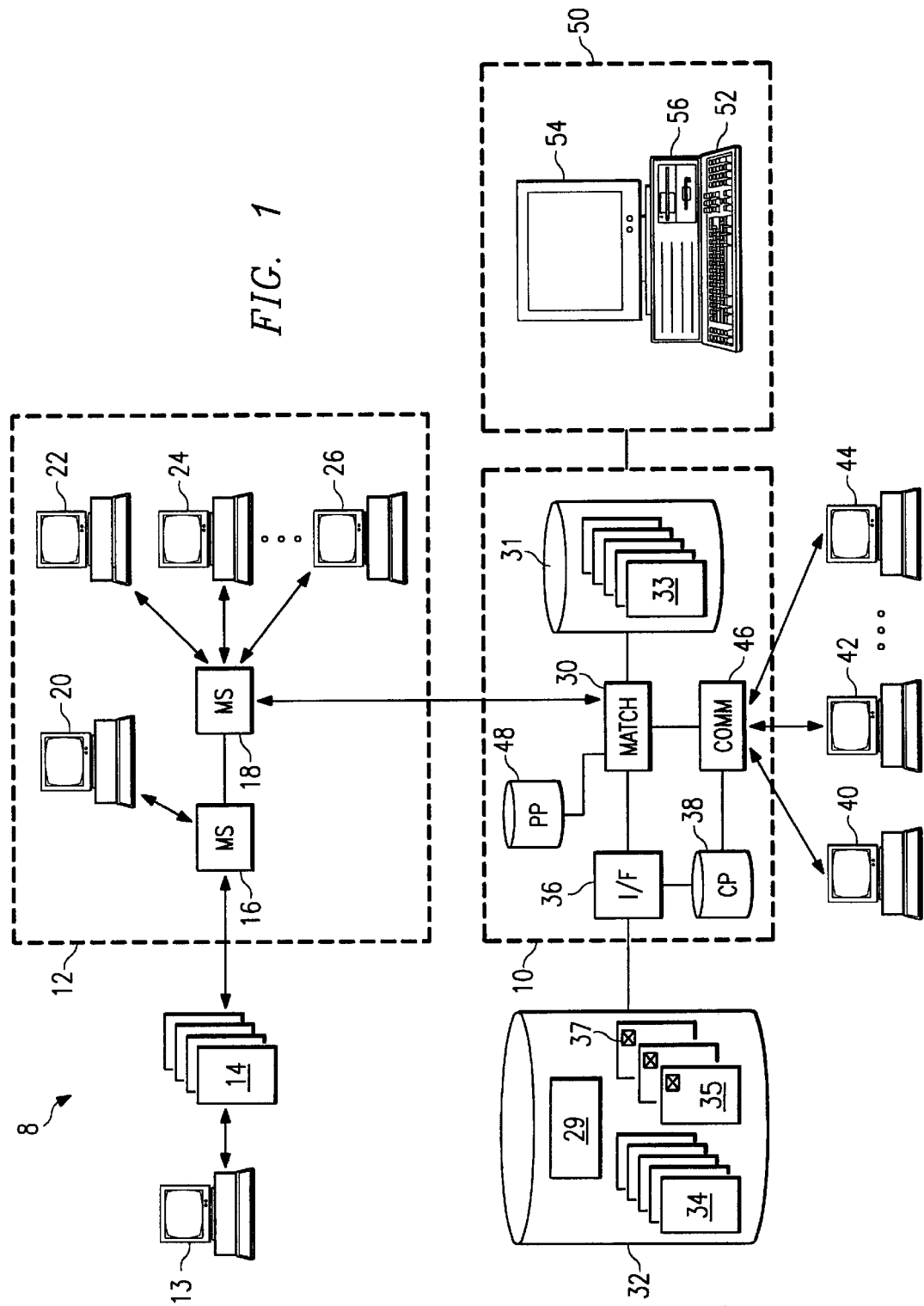
FIG. 1 illustrates an exemplary automated system for matching an item of business property to a recipient according to the teachings of the present invention.

FIG. 1 illustrates an exemplary automated system 8 for matching an item of business property to a recipient. System 8 includes matching system 10 and routing system 12. Matching system 10 receives allocation and authorization information for an excess or otherwise available item from routing system 12 and matches the item to a recipient associated with an item request. The item may be any tangible piece of equipment or other business property owned, leased, managed, maintained, or otherwise under the control or supervision of the organization or for which the organization may be responsible. In one embodiment, the item is an excess item that, although operable, is not needed by a particular individual, group, department, or site with which the item is presently associated or for which there is a higher priority elsewhere within or outside the organization.

Allocation refers generally to any suitable process for physically transferring an item from one or more individuals, groups, departments, or sites within an organization to a recipient within or outside the organization. Allocation of an item may be in the form of transfer within the organization, disposal, employee gift, donation, sale, or any other disposition suitable for the needs of the organization. Matching refers generally to any suitable process for finding, locating, identifying, associating, assigning, choosing, or otherwise determining a recipient to which an item may be allocated in some suitable manner.

Routing system 12 receives allocation data 14 for the item from a submitter 13 and routes allocation data 14 to a coordinator 20 and one or more authorizers 22, 24, or 26 for authorization of the allocation. Allocation data 14 may include any information suitable for authorizing the allocation of the item and matching the item to a recipient. Submitter 13 may be autonomous or operated by an employee, manager, supervisor, executive, or any other person associated with the organization that desires to allocate the item. Authorizers 22, 24, and 26 may be autonomous or operated by any persons such as managers, supervisors, or executives that have the authority to and may authorize allocation of the item, depending on the value or other characteristics of the item. Coordinator 20 may be autonomous or operated by any person within the organization, such as a manager or supervisor, suitable to coordinate the operations of routing system 12. In one embodiment, coordinator 20 selects a particular authorizer 22, 24, or 26.

Routing system 12 includes mail servers 16 and 18, coordinator 20, and authorizers 22, 24, and 26. Although at least a portion of allocation data 14 is provided by submitter 13, allocation data 14 may also be generated by coordinator 20, one or more authorizers 22, 24, and 26, mail servers 16 and 18, routing system 12, or any combination of the above. Routing system 12 may be any electronic mail or other communications system operating on one or more computers or other processing devices. Routing system 12 may include OFFICE VISION MAIL, LOTUS NOTES, MICROSOFT MAIL, an interactive web page, or any other suitable communications application or tool. Routing system 12 includes all hardware and/or software appropriate to receive, transmit, send, forward, reply to, store, archive, and otherwise communicate messages concerning the item between submitter 13, coordinator 20, and authorizers 22, 24, and 26 using mail servers 16 and 18.

Mail servers 16 and 18 are coupled to and interact with each other and with submitter 13, coordinator 20, and authorizers 22, 24, and 26 to communicate information for authorizing allocation of the item, as an excess item or otherwise. Mail servers 16 and 18 are computers or other processing devices that manage communications between submitter 13, coordinator 20, authorizers 22, 24, and 26, and matching system 10. Mail servers 16 and 18 may also manage communications between routing system 12 and a network or other resource external to routing system 12 and matching system 10, using any suitable wireline or wireless link. Submitter 13, coordinator 20, and authorizers 22, 24, and 26 may be any logical entities in hardware and/or software, such as miniframes or personal computers, that send and receive information using mail servers 16 and 18. Although only mail servers 16 and 18, submitter 13, coordinator 20, and authorizers 22, 24, and 26 are discussed, the present invention contemplates more or fewer mail servers, submitters, coordinators, and authorizers, at one or more locations depending on the item, allocation data 14 for the item, the organization, or any other suitable factor.

In operation of routing system 12, submitter 13 provides a first portion of allocation data 14 for the item using an input form residing on components of routing system 12, such as mail servers 16 and 18. Routing system 12 generates a second portion of allocation data 14 according to the routing of allocation data 14 and the authorization for the allocation. Routing system 12 may provide submitter 13 with one or more opportunities to select the manner in which the item is allocated, for example, by transfer within the organization as an excess item. Routing system 12 may provide an input form to submitter 13 based on this selection or may provide submitter 13 with a single input form that is suitable for more than one type of allocation.

Submitter 13 may provide allocation data 14 for more than one item, using a single input form or multiple input forms. Where more than one item is to be matched to a recipient, routing system 12 may process allocation data 14 for each item in a serial fashion, in a prioritized order, more or less simultaneously, or in any other suitable manner. The relationship between allocation data 14 and the input form residing on components of routing system 12 is discussed more fully below in connection with FIG. 2.

Matching system 10 includes a match module (MATCH) 30 that is coupled to mail server 18, a request database 31, one or more priority parameters (PP) 48, an interface (I/F) 36, and a communications module (COMM) 46. Interface 36 and communications module 46 are each coupled to and interact with communication parameters (CP) 38. Interface 36 is coupled to and interacts with an inventory database 32 and a database management system (DBMS) 33 associated with inventory database 32. Communications module 46 also interacts with one or more requesters 40, 42, and 44 from which matching system 10 may receive one or more item requests. In general, matching system 10 receives allocation data 14 for an item from routing system 12 and an item request from a requester 40, 42, or 44, and matches the item to a recipient associated with the item request in some suitable manner.

Inventory database 32 contains inventory data 34 corresponding to items that the organization may wish to allocate at some time during the life of the items or organization. Inventory database 32 may also contain inventory information concerning items the organization may not wish to allocate, for whatever reason. Inventory database 32 may include one or more databases or files at a single or multiple locations, internal or external to matching system 10, that contain any inventory, tracking, or other information concerning the items that may be relevant to matching the items to recipients, as excess items or otherwise, using matching system 10. The inventory data 34 for each item may be identified by a unique item number assigned to the item by the organization or otherwise. Inventory database 32 supports a DBMS 33 that manages access to the resources of inventory database 32. Inventory database 32 may be more or less permanent or may be a temporary file created by extracting inventory information from more permanent files for matching system 10 to use in matching items to recipients and in updating the more permanent files to reflect such matching. Inventory database 32 may include fixed or removable storage media at one or more locations or processing devices, such as random access memory (RAM), read only memory (ROM), magnetic computer disks, CD-ROM, or any other volatile or non-volatile memory.

Match module 30 receives allocation data 14 from mail server 18. Match module 30 identifies the first portion of allocation data 14 provided by submitter 13 and generates match data for the item for transmission to inventory database 32. The match data represents the first portion of allocation data 14, in whole or in part, and may duplicate some or all of the first portion of allocation data 14. For example, the first portion of allocation data 14 might include the name, location, telephone number, facsimile number, network address or other information concerning a person to contact if the item is desired by another individual, group, department, site, or other recipient within the organization. The corresponding match data might include some or all of the identical information or representations of that information. As discussed below, matching system 10 may associate the match data for the item with the inventory data 34 for the item in inventory database 32.

Match module 30 transmits the match data for the item to inventory database 32 using interface 36. Interface 36 may be any mechanism suitable to allow match module 30 and inventory database 32 to communicate information with one another. For example, interface 36 may include the appropriate hardware and software to communicate using a direct connection to a public switched telephone network, a connection through a local area network (LAN), wide area network (WAN), or other network, or any other suitable communications connection to access one or more databases or files at one or more locations. Interface 36 may also include protocol conversion and some data processing capabilities that allow interface 36 to facilitate data communications between match module 30 and inventory database 32.

Interface 36 accesses communication parameters 38 to communicate information with inventory database 32. For each database or file included in inventory database 32, communication parameters 38 maintain access information that may include, without limitation: a username, a password, a telephone number, communication port settings, database specifications, library and file names, directory paths, library and file paths, protocol information, and any other information suitable for accessing inventory database 32 and communicating information between match module 30 and inventory database 32.

Inventory database 32 receives the match data from match module 30 and interface 36. In one embodiment, inventory database 32 and its associated DBMS 33 associate the match data for the item with the inventory data 34 corresponding to the item. In combination, the match data and associated inventory data for the item may be referred to as availability data 35. The existence of the match data or the existence of availability data 35, which represents the association of the match data with inventory data 34 for the item, may indicate to matching system 10 that the item is available for matching to a recipient. Matching system 10, in conjunction with inventory database 32 and its associated DBMS, may also associate an availability indicator 37 with availability data 35, the match data, or inventory data 34 for the item to indicate the availability of the item.

Matching system 10 may populate one or more databases or files in one or more locations, internal or external to matching system 10, with match data, inventory data 34, or availability data 35 for items that are available for matching to a recipient. Matching system 10 might then access one or more of these databases or files to match items to recipients rather than searching inventory database 32 in its entirety to identify excess or otherwise available items. The present invention contemplates indicating the availability of an item for matching to a recipient in any suitable manner using the match data, inventory data 34, or availability data 35 for the item stored in inventory database 32 or other suitable data repository.

Communications module 46 is coupled to and interacts with an electronic mail system or other suitable communications system, which may include routing system 12, to communicate item requests and other information between match module 30 and one or more requesters 40, 42, and 44. Communications module 46 may include appropriate hardware and software to communicate using a direct connection to a public switched telephone network, a connection through a local area network (LAN), wide area network (WAN), or other network, or any other suitable communications connection. Further, communications module 46 may include protocol conversion and data processing capabilities that allow communications module 46 to facilitate data communications between match module 30, requesters 40, 42, and 44, and other selected persons or devices. Communications module 46 may also access one or more communications parameters 38 to facilitate such communications. Although only requesters 40, 42, and 44 are discussed, the present invention contemplates more or fewer request stations, depending on the need or desire for items, the particular organization, and other suitable factors.

Match module 30 receives item requests 33 from requesters 40, 42, and 44 and may prioritize or order item requests 33 using one or more priority parameters 48. Priority parameters 48 may include, without limitation: priority rankings for some or all of the individuals, groups, departments, sites, or other recipients within or outside the organization that may communicate an item request 33 to matching system 10; priority rankings for different types of items or items of different qualities or values; the date the item request 33 was generated or submitted; the date the item is needed or desired, if not immediately; an urgency parameter provided by the requester with the item request 33; or any other prioritization or ordering information.

In one embodiment, match module 30 stores item requests 33 using request database 31 in a queued, ordered, or other suitable arrangement according to the prioritization of item requests 33. Request database 31 may include fixed or removable storage media at one or more locations or processing devices, such as random access memory (RAM), read only memory (ROM), magnetic computer disks, CD-ROM, or any other volatile or non-volatile memory. The relationship between stored item requests 33 and availability data 35 is discussed more fully below with reference to FIG. 3.

Match module 30 searches inventory database 32 to identify one or more items that are available for matching, as indicated by the existence, content, or association with inventory data 34 of match data, availability data 35, availability indicators 37, or any combination of these or other suitable indicia of availability. In general, match module 30 attempts to satisfy item requests 33 by matching such available items to requesters 40, 42, and 44 or other recipients associated with the stored and queued, prioritized, or ordered item requests 33. Match module 30 may search inventory database 32 for one or more items to satisfy each item request 33, may search inventory database 32 for one or more items to satisfy a particular item request 33, may search inventory database 32 periodically for items to satisfy some or all of the item requests 33, or may search inventory database 32 in any other suitable manner to match excess or otherwise available items to recipients.

For example, match module 30 might receive an item request 33 from requester 42 for a computer of a specified type and having a specified value that is available for immediate allocation. In response, match module 30 might prioritize the item request 33 according to one or more priority parameters 48, store the item request 33 using request database 31 in a queued or other ordered arrangement according to the prioritization, subsequently select the item request 33 according to its queued or ordered position, and search inventory database 32 in some suitable manner to match an item to a recipient associated with the item request 33.

In one embodiment, match module 30 searches inventory database 32 for match data, availability data 35, or availability indicators 37. Each time match data, availability data 35, or an availability indicator 37 is identified, match module 30 determines whether the corresponding item satisfies the particular item request 33 by comparing the request data contained in the item request 33 to the inventory data 34, match data, or availability data 35 for the item. As discussed above, match module 30 may also search a database, file, or other data repository that contains inventory data 34, match data, availability data 35, or any combination of the above, whether or not extracted from inventory database 32, for each excess or otherwise available item. In this case, match module 30 might not to need determine the availability of the corresponding items before determining whether one or more items satisfy the particular item request 33 by comparing the request data associated with the item request 33 to the inventory data 34, match data, or availability data 35 for the item.

Match module 30 may search inventory database 32 or other suitable data repository to identify excess or available items serially, more or less simultaneously, or in any other suitable manner. Match module 30 may search for an item that is to become available at some known or unknown date in the future. If two or more stored item requests 33 are satisfied by the same item, match module 30 may match the item to the recipient associated with the item request 33 having the highest priority, as assigned by match module 30 according to priority parameters 48 upon receiving the item request from requester 40, 42, or 44. The present invention contemplates matching an excess or available item to a recipient in any suitable manner according to the item, allocation data 14, inventory data 34, match data, or availability data 35 for the item, the request data associated with one or more item requests 33, one or more priority parameters 48, or any other suitable factors or combination of factors.

Matching system 10 may operate on one or more computers 50 that are integral to or separate from the hardware and software that support the components of routing system 12, interface 36, communications module 42, and requesters 40, 42, and 44. Computer 50 may include an input device 52, such as a keypad, touch screen, microphone, or other device that can accept information. An output device 54 may convey information associated with the operation of matching system 10, including digital or analog data, visual information, or audio information. Both input device 52 and output device 54 may include fixed or removable storage media, such as magnetic computer disks, CD-ROM, or other suitable media to both receive output from and provide input to matching system 10. Computer 50 may have a processor 56 and an associated volatile or non-volatile memory to execute instructions and manipulate information in accordance with the operation of matching system 10.

In operation, routing system 12 receives allocation data 14 for an item from submitter 13 and routes allocation data 14 to coordinator 20 and one or more requesters 22, 24, and 26. If allocation of the item is authorized, allocation data 14 is transmitted to matching system 10 and match module 30. Match module 30 identifies the first portion of allocation data 14 and generates match data that wholly or partially represents the first portion of allocation data 14. Match module 30 transmits the match data to inventory database 32 using interface 36 and communication parameters 38. Inventory database 32 associates the match data with inventory data 34 for the item, possibly in the form of availability data 35, and may also associate an availability indicator 37 with the inventory data 34, match data, or availability data 35 for the item.

Match module 30 receives item requests 33 from requesters 40, 42, and 44 using communications module 46. Match module 30 prioritizes item requests 33 according to one or more priority parameters 48 and stores item requests 33 using request database 31 in a queued or other ordered arrangement according to the prioritization. Match module 30 searches inventory database 32 or other suitable data repository to identify excess or otherwise available items that satisfy the item requests 33. Match module 30 matches the items to recipients associated with the item requests 33 accordingly. If match module 30 is unable to match an item to a recipient, the item may be allocated by disposal, employee gift, donation, sale, or in some other suitable manner.

FIG. 2 illustrates an input form 100 residing on routing system 12 and containing allocation data 14 for an excess or otherwise available item. Although only one item is discussed, input form 100 may contain allocation data 14 for a single item or for multiple items in any suitable form. In one embodiment, input form 100 contains first portion 102 of allocation data 14 that is provided by the submitter and may include, without limitation: a recipient identifier 104 that corresponds to an intended or preferred recipient within the organization; an item number 106 that the organization may assign to the item; a location identifier 108 setting forth the location of the item; an item type 109 that generally or specifically describes the technology, use, or function to which the item may pertain; a manufacturer identifier 110; a manufacturer part number 112; a serial number 114 for the item; a net book or other value associated with the item 116; a contact identifier 118; contact communications information 120 such as a telephone number, facsimile number, network address, or other suitable identifier; a projected availability date for the item 122; an authorizer identifier 124, if a preferred authorizer exists; and any other identification, allocation, or other suitable information concerning the item.

As discussed above in connection with FIG. 1, first portion 102 of allocation data 14 is received from submitter 13 and routed to coordinator 20 and a particular authorizer 22, 24, or 26 for authorization of the allocation, as an excess item or otherwise. Input form 100 may also contain a second portion 126 of allocation data 14 that is generated by coordinator 20, one or more of the authorizers 22, 24, and 26, or components of routing system 12 such as mail servers 16 and 18, according to the routing of first portion 102 of allocation data 14 and the authorization for the allocation. The present invention contemplates some or all of first portion 102 and second portion 126 of allocation data 14 being identical, first portion 102 including some or all of second portion 126, second portion 126 including some or all of first portion 102, or any other suitable relationship between first portion 102 and second portion 126.

Second portion 126 of allocation data 14 may include, without limitation: a submitter identifier 128; a coordinator identifier 130; an authorizer identifier 132; communications information 134 concerning submitter 13, coordinator 20, or authorizer 22, 24, or 26 such as a telephone number, facsimile number, network address, or other suitable identifier; an authorization date 136; an authorization time 138; time and date information 140 concerning the generation or provision of allocation data 14 by submitter 13; a routing history 142 setting forth some or all of the components or persons, including submitter 13, coordinator 20, and authorizer 22, 24, or 26, who have received or handled allocation data 14; a unique transaction number 144 assigned to the item by routing system 12; and any other suitable tracking or other information concerning the item. First portion 102 and second portion 126 of allocation data 14 are communicated to match module 30 by mail server 18 and received by match module 30 for further processing.

FIGS. 3a and 3b illustrate an exemplary relationship between a stored item request 33, shown in FIG. 3a, and availability data 35 for a particular excess or available item, shown in FIG. 3b. Although item request 33 is discussed as expressing a need or desire for only one item, item request 33 may express a need or desire for a single item or for multiple items in any suitable form. In one embodiment, item request 33 contains request data 152 that is provided by the requester 40, 42, or 44 and may include, without limitation: an item identifier 154 for a particular desired item that is assigned by the manufacturer, the organization, or in some other manner, if the requester 40, 42, or 44 knows of such an item; an item type 156 that generally or specifically describes the technology, use, or function to which the desired item may pertain; one or more manufacturer identifiers 158 that indicate acceptable, preferred, or desirable manufacturers of the desired item, if any; one or more specifications 160 indicating a minimum, maximum, or range of capabilities or features the desired item may or must provide, if any; a value parameter 162 indicating a threshold or range of monetary or other values the desired item may or must possess, if any; an allocate date 164 indicating the date by which the desired item may or must be matched or allocated to the recipient, if any; an urgency parameter 166 indicating a level of urgency associated with the item request 33, if any, according to some suitable scale; and any other suitable information concerning a request to match an excess or otherwise available item to a recipient.

As discussed above in connection with FIG. 1, match module receives each item request 33 from requester 40, 42, or 44 using communications module 46, assigns a priority to the item request 33 according to one or more priority parameters 48, and stores the item request 33 using request database 31 in a queued, prioritized, ordered, or other suitable arrangement. In addition to request data 152 provided by the requester 40, 42, or 44, the stored item request 33 may also contain matching information 168 generated by the particular requester 40, 42, or 44, by communications module 46, by match module 30, by request database 31, or by any combination of the above. The present invention contemplates some or all of request data 152 and matching information 168 being identical, the request data 152 including some or all of the matching information 168, the matching information 168 including some or all of the request data 152, or any other suitable relationship between request data 152 and matching information 168.

Matching information 168 may include, without limitation: a requester identifier 170; one or more recipient identifiers 172 corresponding to recipients to which a desired item may be matched or allocated, possibly including the requester 40, 42, or 44; communications information 174 concerning one or more requesters 40, 42, or 44 or recipients, in any combination, such as a telephone number, facsimile number, network address, or other suitable identifier; time and date information 176 concerning the generation or provision of request data 152; a unique item request number 178 assigned to the item request 33 by matching system 10; and any other suitable tracking, matching, or other information concerning the item request 33.

Referring to FIG. 3b, availability data 35 includes match data 180 for the item generated by match module 30 and representing some or all of the allocation data 14 for the item, for example, and not by way of limitation: item type 109, manufacturer identifier 110, manufacturer part number 112, contact identifier 118, contact communications information 120, projected availability date 122, and any other suitable allocation data 14. In one embodiment, match data 180 is associated with inventory data 34 for the item contained in inventory database 32, and the associated match data 180 and inventory data 34 are referred to as availability data 35.

For each item the organization may wish to allocate in some manner during the life of the item or organization, inventory data 34 may include, without limitation: a net book or other value associated with the item 182; a fixed asset identifier 184 indicating whether the item is a fixed asset of the organization; a location identifier 186 indicating the location of the item; a previous location identifier 188 indicating one or more previous locations of the item, if any; a purchase date 190 for the item; a purchase cost 192 for the item; and any other suitable tracking, identification, or other information concerning the excess or otherwise available item. As discussed above in connection with FIG. 1, availability indicator 37 may also be associated with some or all of availability data 35, match data 180, or inventory data 34 in some suitable manner.

Figure 4A:
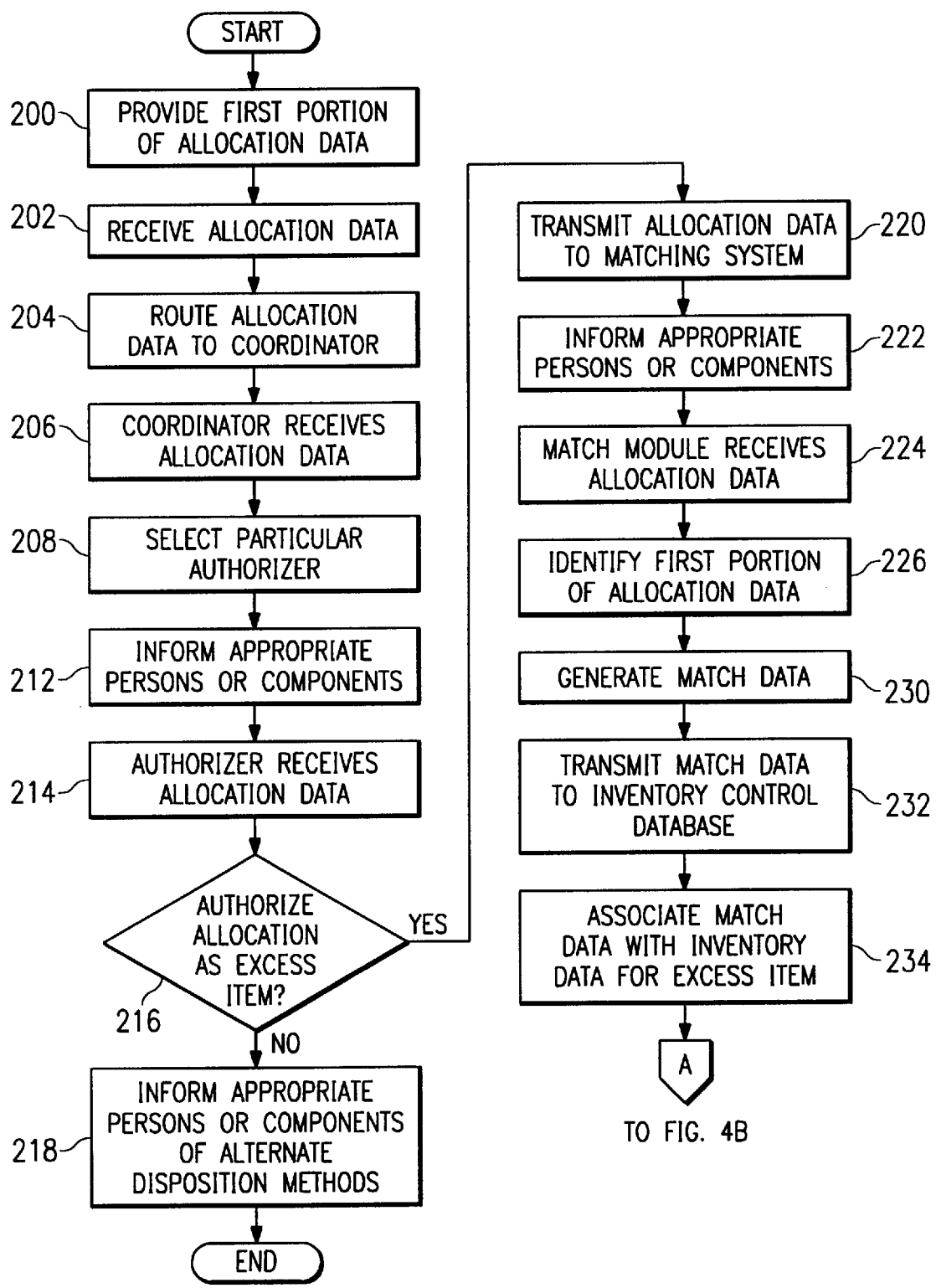
FIGS. 4a through 4c represent a flow chart of an exemplary method for matching an item of business property to a recipient.
Figure 4B:
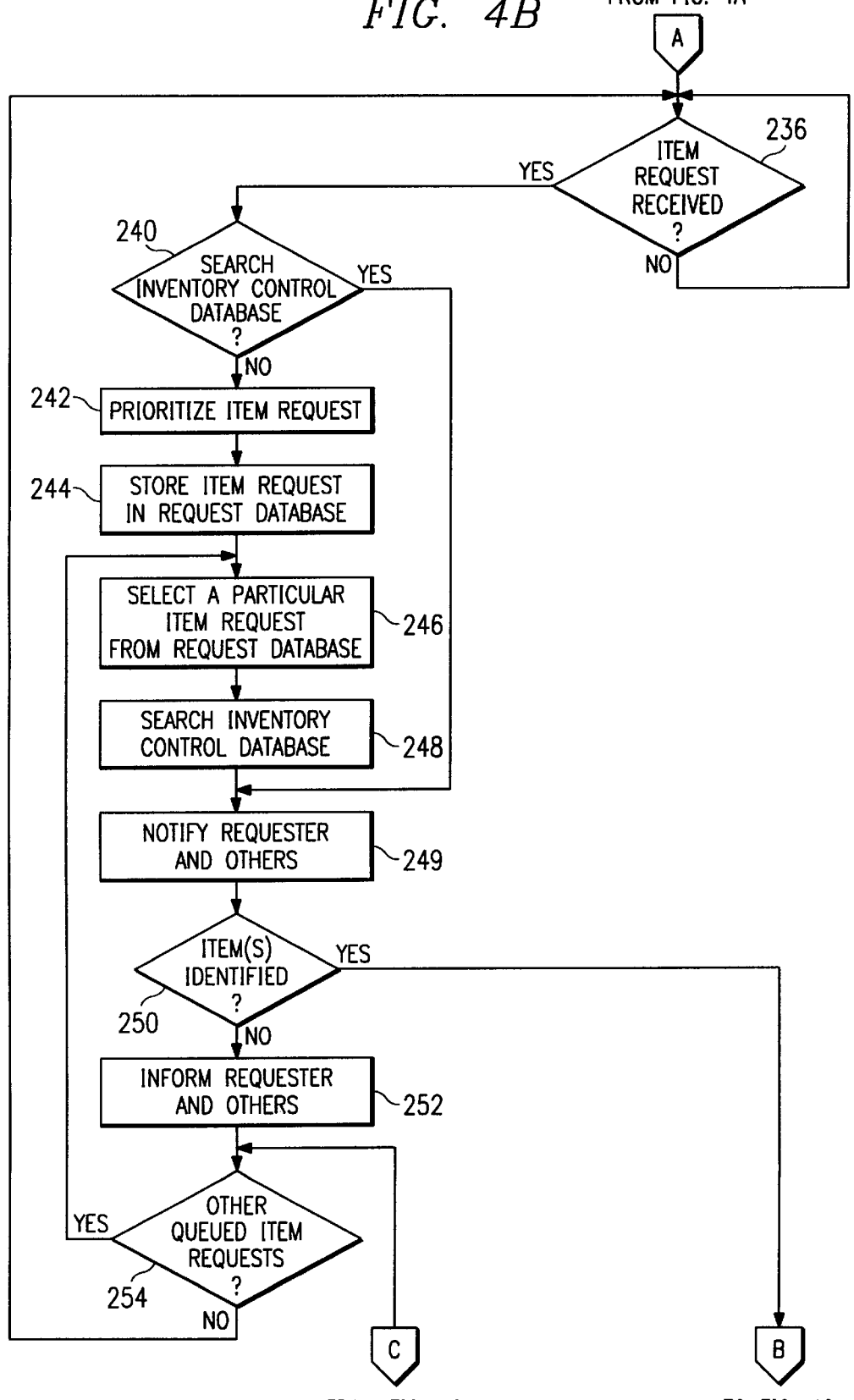
Figure 4C:
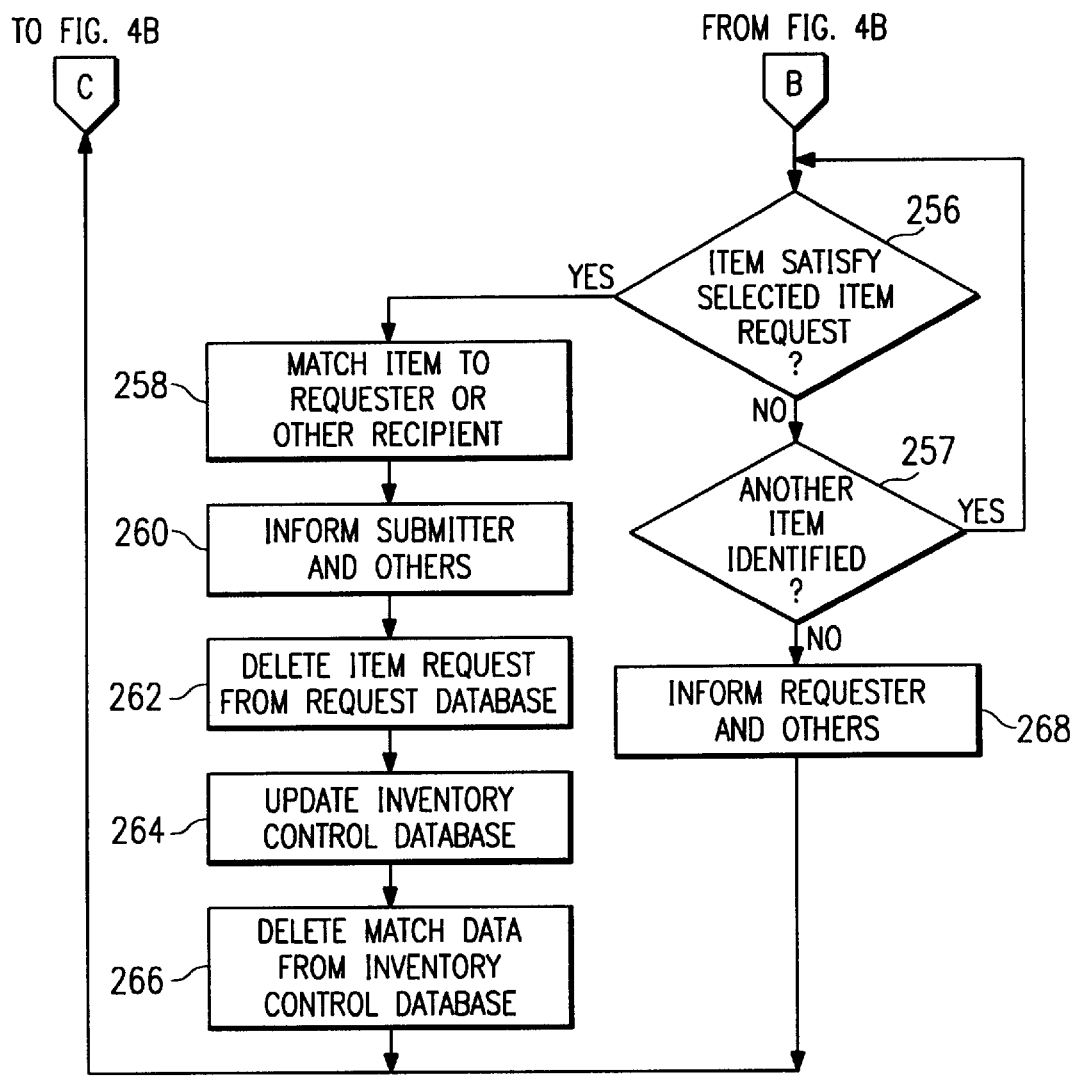

FIG. 4 is a flowchart of an exemplary method for matching an item of business property to a recipient. The method begins at step 200, where submitter 13 provides first portion 102 of allocation data 14. Routing system 12 may receive allocation data 14 from submitter 13 at any suitable location, mail server 16 being an exemplary location. Routing system 12 receives allocation data 14 at step 202 and routes allocation data 14 to coordinator 20 at step 204 using mail server 16. Submitter 13 may provide allocation data 14 that instructs routing system 12 to route allocation data 14 to coordinator 20 or routing system 12 may route allocation data 14 to coordinator 20 automatically using allocation data 14 and one or more specified parameters.

Coordinator 20 receives allocation data 14 at step 206 and, at step 208, selects a particular authorizer 22, 24, or 26 to authorize allocation of the item, as an excess item or otherwise. For example, if the item relates to a particular technology, is under the control or supervision of a particular individual, group, or department, or is located or associated with a particular area or site within the organization, coordinator 20 may select a particular authorizer 22, 24, or 26 that is most suitable for the item, such as authorizer 22. Submitter 13 or coordinator 20 may provide allocation data 14 that instructs routing system 12 to route allocation data 14 to authorizer 22 or routing system 12 may route allocation data 14 to authorizer 22 automatically using allocation data 14 and one or more specified parameters. At step 212, routing system 12 informs one or more appropriate components of routing system 12 or persons within the organization, such as submitter 13 or an operator of submitter 13, that allocation data 14 has been routed to authorizer 22.

Authorizer 22 receives allocation data 14 at step 214. At step 216, authorizer 22 or an operator of authorizer 22 may authorize allocation of the item, as an excess item or otherwise, using allocation data 14 and one or more specified parameters. For example, authorizer 22 might authorize the allocation if authorizer 22 determines that the item is an excess item suitable for transfer to another individual, group, department, site, or other recipient within the organization. Alternatively, if authorizer 22 determines that the item should not be considered an excess item at step 216, authorizer 22 may inform submitter 13, coordinator 20, or other appropriate components or persons, and may further provide a recommendation or other suitable information concerning alternate disposition methods at step 218. Submitter 13 or an operator of submitter 13 might also be given one or more opportunities to select an alternate method of disposition for the item before the method ends.

If authorizer 22 authorizes the allocation at step 216, routing system 12 communicates allocation data 14 for the excess or otherwise available item to matching system 10 at step 220 and may inform one or more appropriate persons or components of this fact at step 222. Match module 30 receives allocation data 14 from mail server 18 at step 224. At step 226, match module 30 identifies first portion 102 of allocation data 14. Match module 30 generates match data 180 for the item at step 230 for communication to inventory database 32. As discussed above, match data 180 represents first portion 102 of allocation data 14, in whole or in part, and may duplicate some or all of first portion 102 of allocation data 14.

At step 232, match module 30 communicates some or all of the match data 180 to inventory database 32 using interface 36 and communication parameters 38. The present invention contemplates match module 30 communicating allocation data 14 to inventory database 32 directly instead of, or in addition to, communicating match data 180 that represents allocation data 14. Match module 30 generating match data 180 may include match module 30 merely communicating allocation data 14, in whole or in part, to inventory database 32.

Inventory database 32 receives match data 180 for the excess item from match module 30 and, at step 234, associates match data 180 with the inventory data 34 for the item. The associated match data 180 and inventory data 34 may be referred to as availability data 35. At step 236, match module 30 may receive an item request 33 from a requester 40, 42, or 44 using communications module 46. If no item request 33 is initially received at step 236, the method waits until an item request 33 is received at step 236. The present invention contemplates match module 30 receiving and processing one or more item requests 33 at any time, whether or not matching system 10 is currently processing one or more other item requests 33 or routing system is processing allocation data 14 for one or more items.

Once an item request 33 is received at step 236, match module 30 may search inventory database 32 at step 240 to identify one or more excess or otherwise available items that may satisfy the item request 33 and may therefore be suitable for matching to a recipient associated with the item request 33, as discussed more fully below. Match module 30 may search inventory database 32 each time an item request 33 is received; may search inventory database 32 after a specified number of item requests 33 have been received; may search inventory database 32 after a specified period has elapsed following a previous search, for example, one or more days, weeks, months, or other suitable period; or in any other suitable manner. Matching system 10 may also alter a regular, usual, or typical search framework according to the priority of the item request 33 or for any other reason.

If match module 30 does not search inventory database 32 at step 240, match module 30 prioritizes the item request 33 at step 242 using one or more suitable priority parameters 48. At step 244, match module 30 stores the item request 33 using request database 31 in a queued, prioritized, or other ordered arrangement according to one or more other prioritized and stored item requests 33. At step 246, match module 30 selects a particular item request 33 from request database 31, for example: the first item request 33 in the queue; the item request 33 provided, generated, or stored longest ago; the item request 33 provided, generated, or stored most recently; the highest priority item request 33 that is not the first item request 33 in the queue; or any other suitable item request 33. At step 248, match module 30 searches inventory database 32 to identify one or more excess or otherwise available items that may satisfy the selected item request 33 and that may therefore be suitable for matching to a recipient associated with the selected item request 33.

If match module 30 searches inventory database 32 at step 240 or at step 248, the method proceeds to step 249, where the requester 40, 42, or 44 or other appropriate components or persons may be informed that matching system 10 is attempting to match an item to the selected item request 33.

At step 250, match module 30 may identify an excess item by identifying match data 180, availability data 35, or an availability indicator 37 that corresponds to the item. If match module 30 does not identify any excess or available items at step 250, the requester 40, 42, or 44 or other appropriate persons or components may be informed at step 252. If there are other item requests 33 in the queue or other ordered arrangement at step 254, the method returns to step 246, where match module 30 may again select a particular item request 33 from request database 31. If there are no other item requests 33 at step 254, the method returns to step 236, where match module 30 waits until another item request 33 is received.

If match module 30 identifies an excess or available item at step 250, match module 30 determines whether the item satisfies the selected item request 33 at step 256. In one embodiment, match module 30 compares some or all of the request data 152 provided by the requester 40, 42, or 44 with some or all of the match data 180, inventory data 34, or availability data 35 for the item that is contained in inventory database 32 or another suitable data repository. For example, match module 30 might search for fields in availability data 35, such as item type 109, manufacturer identifier 110, or manufacturer part number 112, that duplicate, match, resemble, are similar to or substantially similar to, or otherwise correspond to one or more fields in request data 152, such as item type 156, manufacturer identifier 158, and specifications 160. This comparison may indicate whether the item is suitable to satisfy the particular item request 33.

Where some or all of the compared fields are similar but not identical, match module 30 may determine whether the item is sufficiently satisfactory for the item request 33 using one or more specified parameters that are internal or external to match module 30. The present invention contemplates any suitable person within the organization to replace or combine with the functions and operation of match module 30. If the particular excess or available item satisfies the item request 33, match module 30 matches the item to the requester 40, 42, or 44 or other recipient associated with the item request 33 at step 258. At step 260, one or more appropriate components or persons, including submitter 13, coordinator 20, and authorizer 22, may be informed that the item has been matched to the recipient.

Instead of, or in addition to, matching the item to the item request 33 at step 258, the present invention contemplates match module 30 notifying the requester 40, 42, or 44 or other recipient of a potential match for the item request 33 using communications module 46. Match module 30 might provide a list or other information concerning one or more items that are potential matches for the item request 33, and allow the requester 40, 42, or 44 or other recipient to select one or more of the potentially matched items in some suitable manner. The requester 40, 42, or 44 or other recipient might have a limited or unlimited time during which to select an item for a match, and other recipients to which the item may be potentially matched might have an opportunity to select the item for a match during some or all of this selection period. Once a requester 40, 42, or 44 or other recipient associated with the item request 33 selected a potentially matched item, appropriate components or persons might be informed of the match at step 260 in the manner discussed above.

Match module 30 deletes the satisfied item request 33 from request database 31 at step 262. At step 264, match module 30 may cause inventory database 32 and its associated DBMS 33 to update inventory database 32 with new inventory data 34 for the matched item, for example, a new item location 108 or the name of the recipient to which the item was matched. At step 266, match module 30 may cause inventory database 32 and its associated DBMS to delete match data 180, inventory data 34, availability data 35, or any combination of the above from inventory database 32 or from one or more databases, files, or other data repositories containing information concerning the item, and the method returns to step 254. The present invention contemplates deleting the satisfied item request 33 from request database 31, updating inventory database 32 with new inventory data 34, and deleting match data 180 and other information from inventory database 32 in any relative order, before, during, or after components or persons are informed of the match at step 260.

If the particular item does not satisfy the selected item request 33 at step 256, but one or more other excess or available items have been identified at step 257 as a result of searching inventory database 32 at step 248, the method returns to step 256, where a determination is made whether another excess or available item satisfies the selected item request 33. If no other excess or available items have been identified at step 257, the requester 40, 42, or 44 and one or more other appropriate components or persons may be informed at step 268. The method then returns to step 254. The method continues in this manner until each item request 33 has been suitably addressed. System 8 may operate more or less continuously to receive and process item requests 33 from requesters 40, 42, and 44 and allocation data 14 from one or more submitters 13 or may pause at one or more suitable points for any amount of time and for any suitable reason.

In one embodiment, if an excess or otherwise available item is matched to a requester 40, 42, or 44 or other recipient, submitter 13 or the recipient may initiate the physical transfer of the item to the recipient using some or all of the allocation data 14, match data 180, inventory data 34, availability data 35, request data 152, matching information 168, or any suitable combination of this or other information. An item request 33 may expire if not satisfied within some specified period after the item request 33 is received, for example, several weeks, and the requester 40, 42, or 44 notified of the expiration before or after the expiration period concludes. The length of the expiration period might be the same for all item requests 33, might depend on the priority assigned to the item request 33, or might be determined using any other suitable factor. If an excess or otherwise available item is not matched to a requester 40, 42, or 44 or other recipient within a specified period of time, the item may be allocated by disposal, employee gift, donation, sale, or in any other suitable manner. The present invention contemplates system 8 or any suitable person initiating the allocation of the item by one of these alternate disposition methods.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An automated system for matching an item of business property to a recipient, comprising:
an inventory database containing inventory data identifying the item; and
a match module coupled to the inventory database and operable to receive allocation data for the item, the allocation data comprising a first characteristic of the item that is independent of the identity and location of the item, the match module further operable to generate match data for the item based on the first characteristic and to associate the match data with the inventory data, the match module further operable to receive an item request identifying the recipient and containing request data comprising a second characteristic of a desired item, the second characteristic being independent of the identity and location of the desired item, the match module further operable to compare the first characteristic with the second characteristic and to match the item to the recipient if the first characteristic and the second characteristic are consistent.

2. The system of claim 1, further comprising a submitter operable to generate the allocation data.

3. The system of claim 1, wherein the allocation data comprises a contact identifier.

4. The system of claim 1, wherein the first characteristic comprises a value of the item and the second characteristic specifies a value range for the desired item.

5. The system of claim 1, further comprising a routing system having at least one mail station and operable to route the allocation data from a submitter to an authorizer.

6. The system of claim 1, further comprising a routing system operable to append routing information to the allocation data, the routing information identifying an authorizer.

7. The system of claim 1, wherein the match module receives a plurality of item requests, the match module operable to prioritize the item requests.

8. The system of claim 1, wherein the match module receives a plurality of items requests, the match module operable to prioritize the item requests using a requester identifier and to attempt to match the item to the recipient according to the prioritization.

9. The system of claim 1, further comprising a requester operable to communicate the item request.

10. The system of claim 1, wherein:
the first characteristic is selected from the group consisting of:
a capability of the item, and
a function the item is operable to perform; and
the second characteristic is selected from the group consisting of:
a capability range of the desired item, and
a function the desired item should be operable to perform.

11. An automated method for matching an item of business property to a recipient, comprising:
receiving allocation data for the item, the allocation data comprising a first characteristic of the item that is independent of the identity and location of the item;
generating match data for the item based on the first characteristic;
associating the match data with inventory data identifying the item, the inventory data contained in an inventory database;
receiving an item request identifying the recipient and containing request data comprising a second characteristic of a desired item, the second characteristic being independent of the identity and location of the desired item;
comparing the first characteristic with the second characteristic; and
matching the item to the recipient if the first characteristic and the second characteristic are consistent.

12. The method of claim 11, further comprising the step of generating the allocation data, the allocation data generated by a submitter.

13. The method of claim 11, wherein the allocation data comprises a contact identifier.

14. The method of claim 11, wherein the first characteristic comprises a value of the item and the second characteristic specifies a value range for the desired item.

15. The method of claim 11, further comprising the step of routing the allocation data from a submitter to an authorizer.

16. The method of claim 10, further comprising the step of appending routing information to the allocation data, the routing information identifying an authorizer.

17. The method of claim 11, further comprising:
   prioritizing a plurality of item requests; and
   attempting to match the item to the recipient according to the prioritization.

18. The method of claim 11, wherein:
   the first characteristic is selected from the group consisting of:
      a capability of the item, and
      a function the item is operable to perform; and
   the second characteristic is selected from the group consisting of:
      a capability range of the desired item, and
      a function the desired item should be operable to perform.

19. An automated method for matching an item of business property to a recipient, comprising:
   receiving allocation data for the item, the allocation data comprising a first characteristic of the item that is independent of the identity and location of the item;
   generating match data for the item based on the first characteristic;
   associating the match data with inventory data identifying the item, the inventory data contained in an inventory database;
   receiving a plurality of item requests, each item request identifying a corresponding prospective recipient and containing request data comprising a second characteristic of a desired item, each second characteristic being independent of the identity and location of the corresponding desired item;
   prioritizing the item requests;
   comparing the first characteristic with each second characteristic; and
   matching the item to a particular recipient if the first characteristic is consistent with the second characteristic corresponding to the particular recipient.

20. The method of claim 19, wherein the first characteristic comprises a value of the item and each second characteristic specifies a value range for the corresponding desired item.

21. The method of claim 19, wherein the item requests are prioritized using one or more requester identifiers and a match module attempts to match the item to the prospective recipients according to the prioritization.

22. The method of claim 19, wherein:
   the first characteristic is selected from the group consisting of:
      a capability of the item, and
      a function the item is operable to perform; and
   at least one second characteristic is selected from the group consisting of:
      a capability range of the corresponding desired item, and
      a function the corresponding desired item should be operable to perform.

* * * * *